W. A. GREENLAW.
FLEXIBLE PIPE JOINT.
APPLICATION FILED APR. 20, 1908.

927,462.

Patented July 6, 1909.

Witnesses:
Howard Hanscom
Nathan C. Lombard

Inventor:
Warren A. Greenlaw,
by Walter E. Lombard,
Atty.

UNITED STATES PATENT OFFICE.

WARREN A. GREENLAW, OF MELROSE HIGHLANDS, MASSACHUSETTS, ASSIGNOR TO THE GREENLAW MANUFACTURING COMPANY, OF BOSTON, MASSACHUSETTS, A CORPORATION OF MAINE.

FLEXIBLE PIPE-JOINT.

No. 927,462.  Specification of Letters Patent.  Patented July 6, 1909.

Application filed April 20, 1908. Serial No. 428,284.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Flexible Pipe-Joints, of which the following is a specification.

This invention relates to flexible pipe joints and has for its object the production of a pipe in which the friction may be reduced to a minimum when the two pipe members are moved at various angles to one another, this result being obtained by means of a floating seat between the movable member and the member within which it is contained.

The invention consists in certain novel features of construction and arrangement of parts which will be readily understood by reference to the description of the drawings and to the claims hereinafter given.

Figure 1:
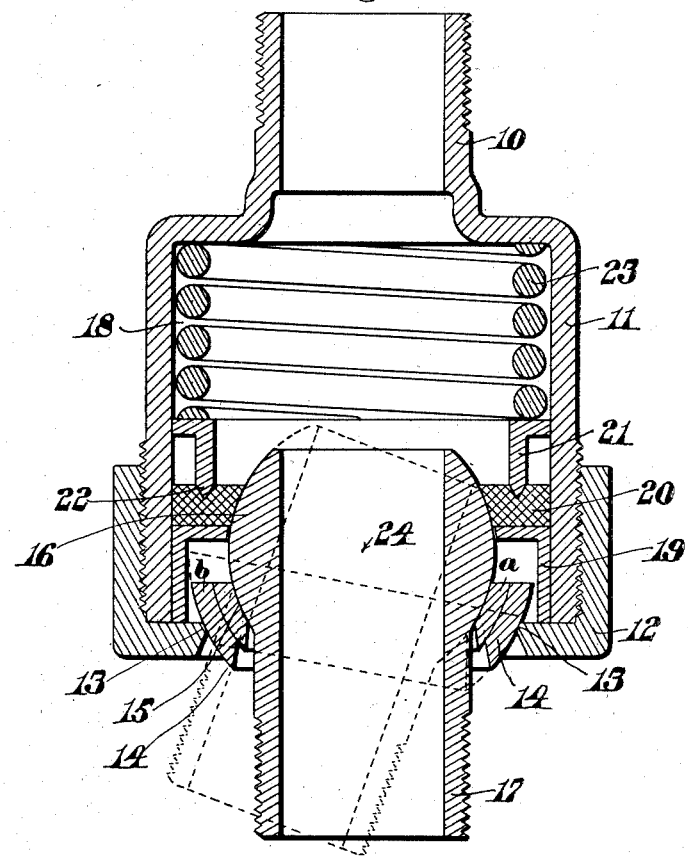
Figure 2:
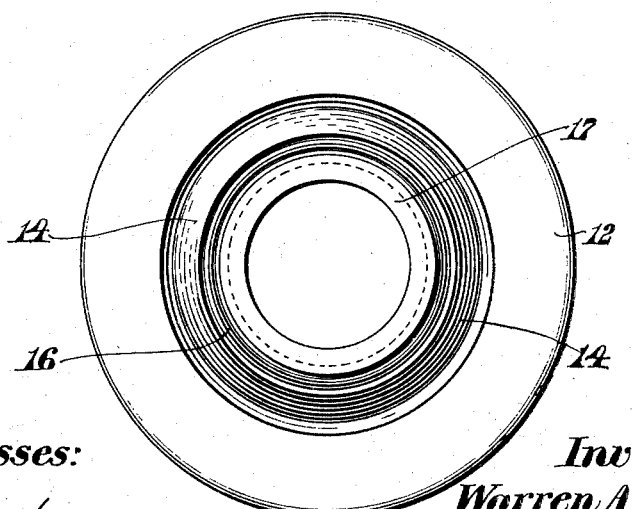

Of the drawings: Figure 1 represents a section of a joint embodying the features of this invention, and Fig. 2 represents an inverted plan of the same.

Similar characters designate like parts throughout the drawings.

In the drawings, 10 represents a pipe member provided with an enlarged cup-shaped end 11 to which is threaded the annular flanged member 12 provided with an annular semi-spherical seat 13 for a floating semi-spherical ring 14 the inner semi-spherical face 15 of which fits the exterior surface of the ball end 16 of the pipe member 17, the diameter of the cylindrical portion of which is somewhat less than the interior diameter of the semi-spherical ring 14. Within the chamber 18 of the cup-shaped end 11 is an annular flanged ring 19 supporting a packing 20 which is interposed between the inner wall of the chamber 18 and the outer surface of the ball end 16. Superimposed upon the packing 20 is another flanged ring 21 provided with beveled edges 22 which are embedded in the packing 20. Interposed between the inner wall of the chamber 18 and the ring 21 is a spring 23 which tends to force the beveled edges 22 of the ring 21 into the packing 20 and force the same into more effectual contact with the inner wall of the chamber 18 and the outer surface of the ball end 15. It is obvious that the tension of the spring 23 will be such that when any inward movement of the ball end 16 occurs the spring 23 will resist this inward movement while at the same time it is forcing the ring 21 to act upon the packing 20 to cause the packing to impinge more firmly upon the surface with which it co-acts, thus preventing any leakage from the joint.

The floating ring 14 forms an important feature of this invention as it tends to reduce to a minimum the friction resulting in the moving of the pipe members to various angles with each other. In full lines in Fig. 1 the ring is shown in its normal position, the inner walls thereof being separated slightly from the cylindrical portion of the pipe member 17. When a movement of the pipe member 17 occurs about the center 24 of the ball end 16 the outer surface of the ball end 16 will ride upon the seat 15 on the floating ring 14 until such a time as the outer periphery of the pipe member 17 comes into contact with the inner wall of said ring after which the ring and pipe member will move in unison, the outer periphery of the ring 14 moving over the seat 13 on the cap 12. It has been found by experiment that this construction produces excellent results in accomplishing the object sought to be attained, that is, the reduction of friction during the movement of the pipe members relative to each other under the extreme pressure under which the movement is usually made. Still better results may be obtained by dividing the ring 14 into a plurality of parts as *a* and *b*, the part *a* having a semi-spherical seat upon the part *b* while its inner diameter is somewhat less than the inner diameter of the part *b*, as shown in Fig. 1. This construction permits one part to move upon the other for a limited distance before the parts *a* and *b* are moved together as has been hereinbefore described.

It is believed that the operation of the invention and the many advantages of a joint of this kind will be thoroughly understood without further description.

Having thus described my invention, I claim:

1. In a flexible pipe joint, the combination of a pipe member provided with a cup-shaped end; an annular flanged ring therein; a cap threaded to said cup-shaped member and retaining said ring within said cup-shaped member said cap being provided with a semi-spherical seat; a second pipe member having a ball-shaped end positioned in said cup-shaped end; a floating ring seated on said cap and provided with a seat for said ball end; and means for retaining said annular flanged ring against said cap.

2. In a flexible pipe joint, the combination of a pipe member provided with a cup-shaped end; an annular flanged ring therein; a cap threaded to said cup-shaped member and retaining said ring within said cup-shaped member said cap being provided with a semi-spherical seat; a second pipe member having a ball-shaped end positioned in said cup-shaped end; a floating ring seated on said cap and provided with a seat for said ball end; and a spring for retaining said annular flanged ring against said cap.

3. In a flexible pipe joint, the combination of a pipe member provided with a cup-shaped end; an annular flanged ring therein; a cap threaded to said cup-shaped member and retaining said ring within said cup-shaped member said cap being provided with a semi-spherical seat; a second pipe member having a ball-shaped end positioned in said cup-shaped end; a floating ring seated on said cap and provided with a seat for said ball end; a packing on said annular flanged ring bearing upon said ball end; and means for forcing said packing into contact with said ball end.

Signed by me at 7 Water st., Boston, Mass., this 15th day of April, 1908.

WARREN A. GREENLAW.

Witnesses:
EDNA C. CLEVELAND,
NATHAN C. LOMBARD.